(12) United States Patent
Imagawa (10) Patent No.: US 11,619,154 B2
(45) Date of Patent: Apr. 4, 2023

(54) EXHAUST GAS PURIFICATION FILTER

(71) Applicant: DENSO CORPORATION, Kariya (JP)

(72) Inventor: Hirokatsu Imagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/454,323

(22) Filed: Nov. 10, 2021

(65) Prior Publication Data

US 2022/0065146 A1  Mar. 3, 2022

Related U.S. Application Data (63) Continuation of application No. PCT/JP2020/013513, filed on Mar. 26, 2020.

(30) Foreign Application Priority Data

May 15, 2019 (JP) .............................. JP2019-091929

(51) Int. Cl.
*F01N 3/022* (2006.01)

(52) U.S. Cl.
CPC ........ *F01N 3/0222* (2013.01); *F01N 2470/20* (2013.01)

(58) Field of Classification Search
CPC .......... B01D 46/24492; B01D 46/2498; B01D 2239/1216; B01D 2239/1208; B01D 2239/12; F01N 3/022; F01N 2470/20; F01N 3/28; F01N 3/24; F01N 3/0222
See application file for complete search history.

(56) References Cited

U.S. PATENT DOCUMENTS

| | | |
|---|---|---|
| 2003/0024220 A1 | 2/2003 | Ishihara et al. |
| 2003/0041574 A1 | 3/2003 | Noguchi et al. |
| 2007/0119135 A1 | 5/2007 | Miao et al. |
| 2009/0247396 A1 | 10/2009 | Mizutani |
| 2010/0011726 A1 | 1/2010 | Ishikawa |
| 2011/0198772 A1 | 8/2011 | Watanabe |
| 2013/0243999 A1 | 9/2013 | Hirose et al. |
| 2020/0101442 A1 | 4/2020 | Kayama |

FOREIGN PATENT DOCUMENTS

| | | |
|---|---|---|
| EP | 1 403 231 | 3/2004 |
| EP | 2 174 701 | 4/2010 |
| JP | 2020-054985 | 4/2020 |

*Primary Examiner* — Anthony Ayala Delgado
(74) *Attorney, Agent, or Firm* — Nixon & Vanderhye P.C.

(57) ABSTRACT

In an exhaust gas purification filter, a partition wall has communicating pores. Each communicating pore has a surface opening on the gas-inflow-side surface and a plurality of portions, each portion having a diameter being reduced and then increased from the surface opening, one of the portions, whose diameter is the smallest, being defined as an inlet neck portion. As viewed in cross section in a thickness direction of the partition wall, the surface opening of each communication pore has a diameter defined as a surface opening diameter, the inlet neck portion of each communication pore has a diameter defined as an inlet neck diameter. The inlet neck diameter is smaller than the surface opening diameter, and an average value of the inlet neck diameters is 15 μm or less. A surface opening ratio of the communicating pores in plan view of the gas-inflow-side partition wall surface is 40% or more.

8 Claims, 7 Drawing Sheets

EXHAUST GAS PURIFICATION FILTER

CROSS-REFERENCE TO RELATED APPLICATION

The present application is a continuation application of International Application No. PCT/JP2020/013513, filed on Mar. 26, 2020, which claims priority to Japanese Patent Application No. 2019-091929, filed on May 15, 2019. The contents of these applications are incorporated herein by reference in their entirety.

BACKGROUND

Technical Field

The present disclosure relates to an exhaust gas purification filter.

Background Art

Exhaust gas discharged from internal combustion engines such as gasoline engines and diesel engines contains particulate matter (hereinafter may be referred to as "PM", as appropriate) called particulates. In order to collect PM in the exhaust gas to purify the exhaust gas, an exhaust gas purification filter is disposed in an exhaust passage of the internal combustion engines.

SUMMARY

In the present disclosure, provided is an exhaust gas purification filter as the following.

In an exhaust gas purification filter, a partition wall has communicating pores. Each of the communicating pores has a surface opening on the gas-inflow-side surface and a plurality of portions, each of the portions of each of the communicating pores having a diameter, the diameter of each of the portions of each of the communicating pores being reduced and then increased again from the surface opening of the corresponding one of the communicating pores, one of the portions of each of the communication pores, whose diameter is the smallest, being defined as an inlet neck portion of the corresponding one of the communication pores. As viewed in cross section in a thickness direction of the partition wall, the surface opening of each of the communication pores has a diameter defined as a surface opening diameter, the inlet neck portion) of each of the communication pores has a diameter defined as an inlet neck diameter. The inlet neck diameter of each of the communication pores is smaller than the surface opening diameter thereof, and an average value of the inlet neck diameters of the communication pores is 15 μm or less. A surface opening ratio of the communicating pores in plan view of the gas-inflow-side partition wall surface is 40% or more.

BRIEF DESCRIPTION OF THE DRAWINGS

The above object and other objects, features, and advantages of the present disclosure will become more apparent from the following detailed description with reference to the accompanying drawings, wherein.

DETAILED DESCRIPTION OF THE PREFERRED EMBODIMENTS

As an exhaust gas purification filter, for example, Patent Literature 1 discloses a diesel particulate filter (hereinafter may be referred to as "DPF") that collects PM discharged from a diesel engine. Specifically, Patent Literature 1 describes a technique for forming, on a partition wall, a PM collection layer having an average pore diameter smaller than that of the partition wall.

[PTL 1] JP 2010-110750 A

The amount of PM discharged from gasoline engines is much smaller than the amount of PM discharged from diesel engines. However, since a restriction on the particulate number of PM has been introduced, a vehicle having a gasoline engine (hereinafter referred to as "gasoline vehicle") also needs to be equipped with a gasoline particulate filter (hereinafter may be referred to as "GPF", as appropriate) capable of collecting PM discharged from the gasoline engine, in order to reduce the particulate number of PM.

On the other hand, from the viewpoint of improving fuel economy considering $CO_2$ restrictions, for more efficient fuel combustion, injectors are expected to achieve higher-pressure injection (e.g., 35 MPa or more) in the future. In this case, the injectors inject finer fuel droplets, and this may cause a phenomenon in which PM particles having a smaller diameter are generated during combustion. The current restriction on the particulate number of PM restricts the particulate number of PM of 23 nm or more; however, PM having a smaller particle diameter (e.g., 10 nm or more) is expected to be restricted in the future.

Since the particulate number of PM of 23 nm or more has been restricted, in exhaust gas purification filters mass-produced so far, a pore diameter in a partition wall where PM is collected has been generally adjusted to be approximately 15 to 25 μm, in view of a balance with loss in pressure (hereinafter referred to as "pressure loss", as appropriate) having a trade-off relationship.

However, as described above, when the particle diameter of PM is reduced relative to the pore diameter of the partition wall in the future, PM less frequently collides with or comes in contact with the pore inner wall surface and a larger amount of PM slips through, leading to a deterioration in PM collection performance in terms of the particulate number of PM.

An object of the present disclosure is to provide an exhaust gas purification filter capable of improving PM collection performance in terms of the particulate number of PM.

An aspect of the present disclosure is an exhaust gas purification filter including a plurality of cells each disposed to extend in an axial direction of the filter, each of the cells having opposing first and second ends in the axial direction; a partition wall configured to have a porous structure and define the plurality of cells partitioned from each other; and a plurality of seal members disposed alternately in the first and second ends of the respective cells, each of the seal members being configured to seal a corresponding one of the first end and the second end of a corresponding one of the cells, wherein: the partition wall has a gas-inflow-side surface, a gas-outflow-side surface, and communicating pores, each of the communicating pores being formed through the partitioning wall to open on each of the gas-inflow-side surface and gas-outflow-side surface, each of the communicating pores has, as viewed in cross section in a thickness direction of the partition wall, a surface opening on the gas-inflow-side surface and a plurality of portions, each of the portions of each of the communicating pores having a diameter, the diameter of each of the portions of each of the communicating pores being reduced and then increased again from the surface opening of the corresponding one of the communicating pores, one of the portions of each of the communication pores, whose diameter is the smallest, being defined as an inlet neck portion of the corresponding one of the communication pores, the surface opening of each of the communication pores has a diameter defined as a surface opening diameter, the inlet neck portion of each of the communication pores has a diameter defined as an inlet neck diameter, the inlet neck diameter of each of the communication pores is smaller than the surface opening diameter thereof, and an average value of the inlet neck diameters of the communication pores is 15 µm or less; and a surface opening ratio of the communicating pores in plan view of the gas-inflow-side partition wall surface is 40% or more.

The exhaust gas purification filter has the specific configuration described above. Thus, the exhaust gas purification filter is capable of improving PM collection performance in terms of the particulate number of PM.

Reference numerals in parentheses described in the claims indicate the correspondence with specific means described in the embodiments described later, and do not limit the technical scope of the present disclosure.

First Embodiment

An exhaust gas purification filter 1 of the first embodiment will be described with reference to FIGS. 1 to 8. The direction indicated by the double-headed arrow shown in FIGS. 1 to 3 is referred to as a filter axial direction X of the exhaust gas purification filter 1.

Figure 1:
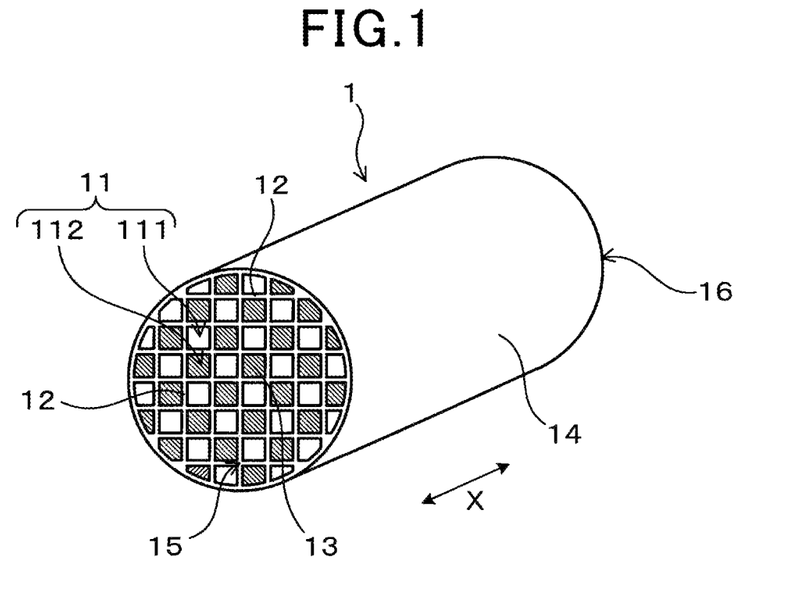
FIG. 1 is a perspective view of an exhaust gas purification filter according to a first embodiment.
Figure 2:
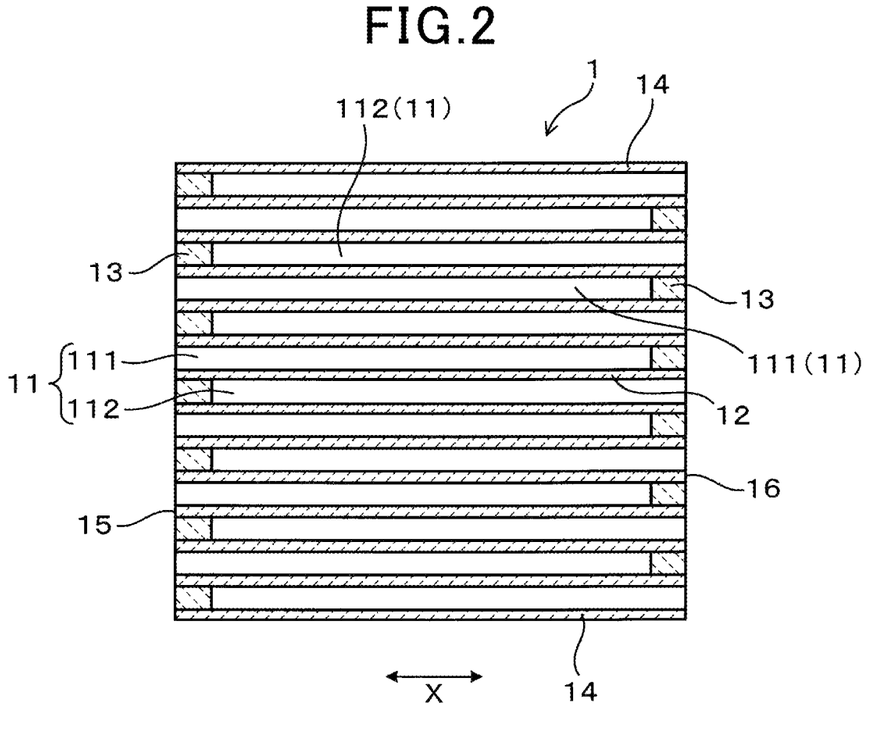
FIG. 2 is a cross-sectional view in a filter axial direction of the exhaust gas purification filter according to the first embodiment.
Figure 3:
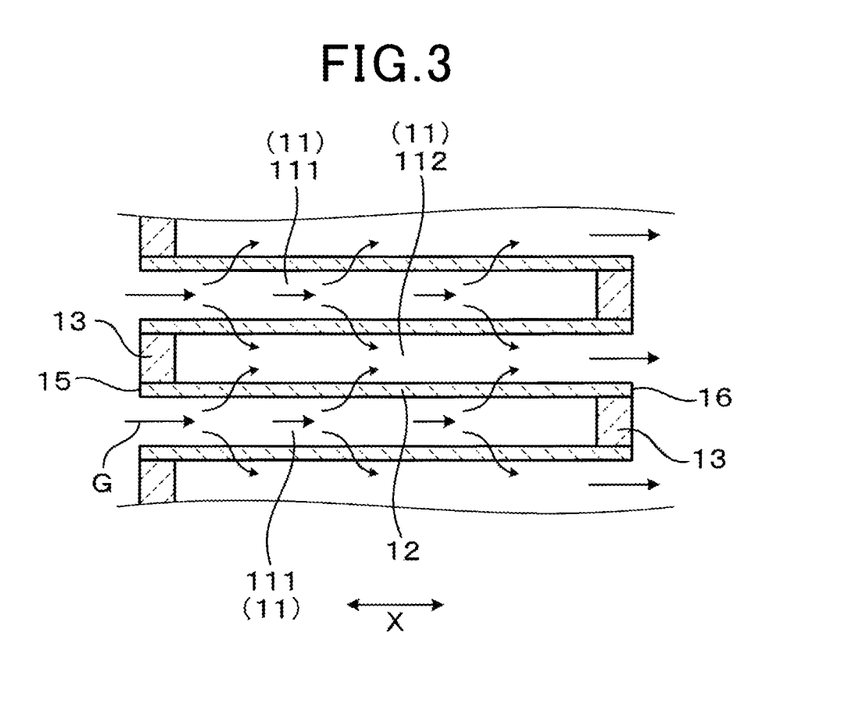
FIG. 3 is a view showing a flow of exhaust gas in the exhaust gas purification filter according to the first embodiment.

As exemplified in FIGS. 1 to 3, the exhaust gas purification filter 1 includes a plurality of cells 11, a partition wall 12, and a seal member 13.

As exemplified in FIGS. 1 to 3, the plurality of cells 11 each extend in the filter axial direction X, each of the cells has opposing first and second ends in the axial direction X. Specifically, the plurality of cells 11 extend from an inflow end surface 15 into which exhaust gas G flows to an outflow end surface 16 out of which the exhaust gas G flows. As viewed in cross section perpendicular to the filter axial direction X, the cells each may have, for example, a quadrilateral shape as exemplified in FIG. 1. The cell shape is not limited to this, and may be, for example, a polygonal shape such as a triangle shape or a hexagonal shape, a circular shape, or the like. Alternatively, the cell shape may be composed of a combination of two or more different shapes.

The partition wall 12 defines the plurality of cells 11 partitioned from each other. Specifically, inside a skin portion 14 that has a tubular shape such as a cylindrical shape, the partition wall 12 may be provided so as to exhibit a pattern such as a grid pattern as viewed in cross section perpendicular to the filter axial direction X. In the exhaust gas purification filter 1, the partition wall 12 and the skin portion 14 may be made of, for example, ceramic such as cordierite. The partition wall 12 may have a thickness of, for example, 120 µm to 360 µm.

The plurality of cells 11 include inflow cells 111 into which the exhaust gas G flows and outflow cells 112 out of which the exhaust gas G flows. The inflow cells 111 and the outflow cells 112 may be, for example, formed so as to be alternately arranged adjacent to each other in a lateral direction orthogonal to the filter axial direction X and in a longitudinal direction orthogonal to both the filter axial direction X and the lateral direction. In this case, when the inflow end surface 15 or the outflow end surface 16 is viewed from the filter axial direction X, the inflow cells 111 and the outflow cells 112 are arranged, for example, in a checkered pattern. The inflow cells 111 and the outflow cells 112 are adjacent to each other, and are separated from each other by the partition wall 12 disposed therebetween.

The seal member 13 is disposed alternately in the first and second ends of the respective cells, each of the seal members seals a corresponding one of the first end and the second end of a corresponding one of the cells. Specifically, as exemplified in FIG. 2, the seal member 13 seals openings of the outflow cells 112 on the inflow end surface 15 side and openings of the inflow cells 111 on the outflow end surface 16 side. Thus, the inflow cells 111 are opened on the inflow end surface 15 side, and on the outflow end surface 16 side, the openings of the inflow cells 111 are closed by the seal member 13 on the outflow side. The outflow cells 112 are opened on the outflow end surface 16 side, and on the inflow end surface 15 side, the openings of the outflow cells 112 are closed by the seal member 13 on the inflow side. The seal member 13 can be made of, for example, ceramic such as cordierite, but may be made of other materials.

In the present embodiment, as exemplified in FIG. 3, the exhaust gas G flows into each of the inflow cells 111 from the inflow end surface 15 which is on an exhaust gas inflow side. The exhaust gas G that has flowed into the inflow cells 111 flows in the inflow cells 111 and also flows in the partition wall 12 that is porous, and reaches the outflow cells 112. The exhaust gas G that has reached the outflow cells 112 flows in the outflow cells 112. The exhaust gas G that has flowed in the outflow cells 112 is discharged from the outflow end surface 16 which is on an exhaust gas outflow side.

Figure 4:
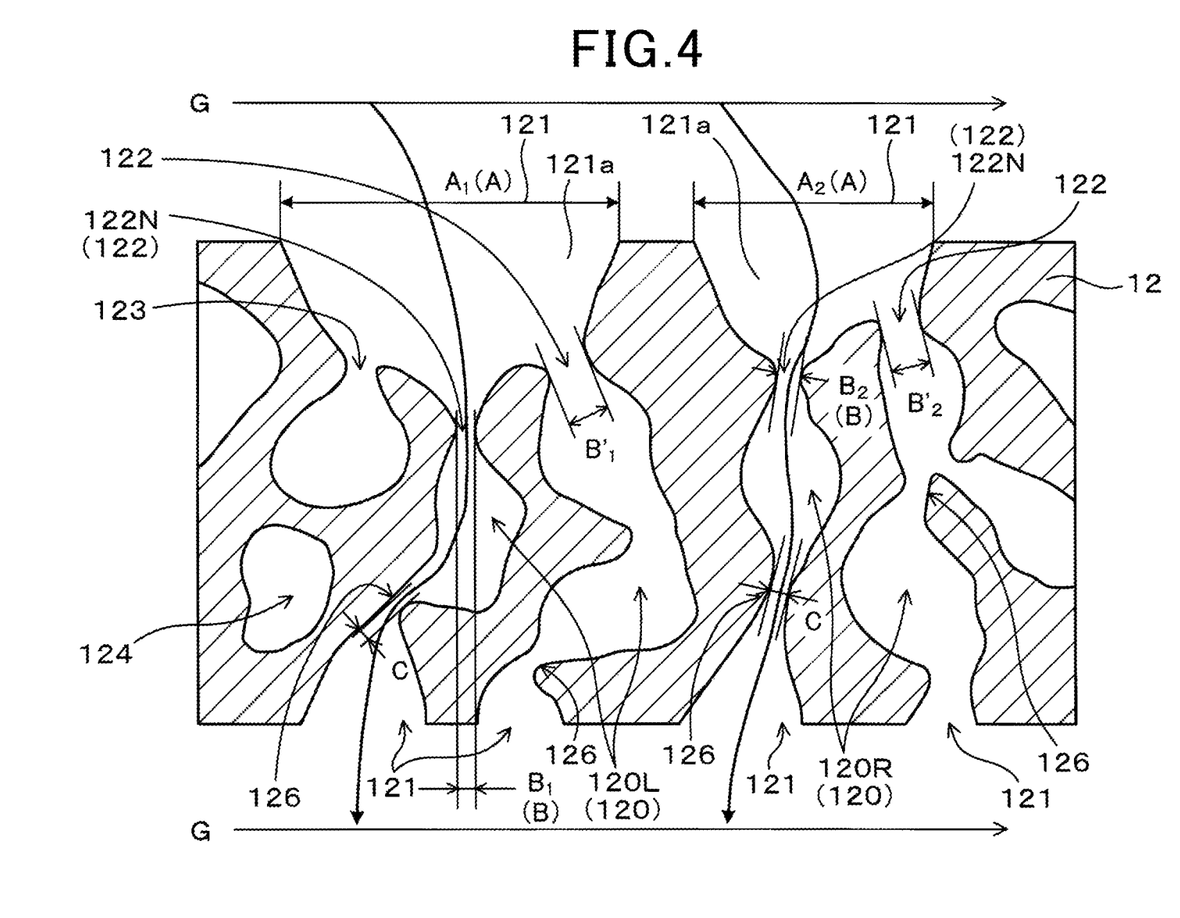
FIG. 4 is a view schematically showing a cross section in a thickness direction of a partition wall of the exhaust gas purification filter according to the first embodiment.

As exemplified in FIG. 4, the partition wall 12 is porous. The partition wall 12 has a gas-inflow-side surface, a gas-outflow-side surface, and communicating pores 120, each of the communicating pores 120 is formed through the partitioning wall 12 to open on each of the gas-inflow-side surface and gas-outflow-side surface. That is, the communicating pores 120 pass through the partition wall 12 to allow communication between the inflow cell 111 and the outflow cell 112 adjacent to each other. Other than the communicating pores 120, the partition wall 12 may have non-communicating pores 124 that do not allow communication between the inflow cell 111 and the outflow cell 112 adjacent to each other.

As exemplified in FIG. 4, each of the communicating pores 120 has, as viewed in cross section in a thickness direction of the partition wall 12, a surface opening 121 on the gas-inflow-side surface and a plurality of portions 122, each of the portions 122 of each of the communicating pores 12 has a diameter, the diameter of each of the portions of each of the communicating pores is reduced and then increased again from the surface opening 121 of the corresponding one of the communicating pores, one of the portions 122 of each of the communication pores, whose diameter is the smallest, is defined as an inlet neck portion 122N of the corresponding one of the communication pores. As viewed in cross section in a thickness direction of the partition wall 12, the surface opening 121 of each of the communication pores has a diameter defined as a surface opening diameter, the inlet neck portion 122N of each of the communication pores has a diameter defined as an inlet neck diameter, the inlet neck diameter of each of the communication pores is smaller than the surface opening diameter thereof. Furthermore, as viewed in cross section in the thickness direction of the partition wall 12, an average value of the inlet neck diameters of the communication pores is 15 µm or less. Furthermore, in plan view of the surface of the partition wall 12 on the gas inflow side, a surface opening ratio of the communicating pores 120 is 40% or more.

Since the exhaust gas purification filter 1 has the above configuration, PM is easily sucked into an opening space 121a that forms the surface opening 121, leading to a higher probability of collision of PM due to inertial motion in the inlet neck portion 122N. Thus, in the exhaust gas purification filter 1, the particulate number of PM collected in the inlet neck portion 122N increases, achieving a higher PM collection rate in terms of the particulate number of PM. The above configuration will be described in detail below.

As viewed in cross section in the thickness direction of the partition wall 12 schematically shown in FIG. 4, the surface of the partition wall 12 in the upper portion is the surface of the partition wall 12 on the gas inflow side, and the surface of the partition wall 12 in the lower portion of FIG. 4 is the surface of the partition wall 12 on the gas outflow side.

As viewed in cross section in the thickness direction of the partition wall 12, the diameter of the surface opening 121 of each of the communicating pores 120 is referred to as a surface opening diameter A. As exemplified in FIG. 4, when a plurality of communicating pores 120 are observed in cross section in the thickness direction of the partition wall 12, the surface opening diameters of the respective plurality of communicating pores 120 may be referred to as, for example, surface opening diameters $A_1, A_2, \ldots A_n$ (n is a natural number) from the left side toward the right side. FIG. 4 exemplifies a communicating pore 120L having a surface opening diameter $A_1$ and a communicating pore 120R having a surface opening diameter $A_2$.

Each of the communicating pores 120 has the portions 122, and each of the portions 122 of each of the communicating pores 120 has a diameter, the diameter of each of the portions of each of the communicating pores being reduced and then increased again from the surface opening 121 of the corresponding one of the communicating pores. In FIG. 4, specifically, the communicating pore 120L having the surface opening diameter $A_1$ has two portions 122 that face the opening space 121a that forms the surface opening 121. Similarly, the communicating pore 120R having the surface opening diameter $A_2$ also has two portions 122 that face the opening space 121a that forms the surface opening 121. With regard to a portion 123 of the communicating pore 120L, in which the pore is closed, the portion 123 does not communicate with the surface of the partition wall 12 on the gas outflow side and cannot serve as a gas flow path. Thus, the portion 123 is not considered as one of the portions 122 described above. In the communicating pore 120L having the surface opening diameter $A_1$, when $B_1$ represents a diameter of the portion 122 on the left side in FIG. 4 and $B_1'$ represents a diameter of the portion 122 on the right side in FIG. 4 (where $B_1 < B_1'$), $B_1$ is the smallest diameter of the portions 122. Thus, in the communicating pore 120L having the surface opening diameter $A_1$, the portion 122 on the left side in FIG. 4 is the inlet neck portion 122N, and $B_1$ is the inlet neck diameter which is the diameter of the inlet neck portion 122N. Similarly, in the communicating pore 120R having the surface opening diameter $A_2$, when $B_2$ represents a diameter of the portion 122 on the left side in FIG. 4 and $B_2'$ represents a diameter of the portion 122 on the right side in FIG. 4 (where $B_2 < B_2'$), $B_2$ is the smallest diameter of the portions 122. Thus, in the communicating pore 120R having the surface opening diameter $A_2$, the portion 122 on the left side in FIG. 4 is the inlet neck portion 122N, and $B_2$ is the inlet neck diameter which is the diameter of the inlet neck portion 122N. The surface opening diameter A ($A_1, A_2, \ldots A_n$; n is a natural number) and the inlet neck diameter B ($B_1, B_2, \ldots B_n$; n is a natural number) described above are measured in the following manner.

Figure 5:
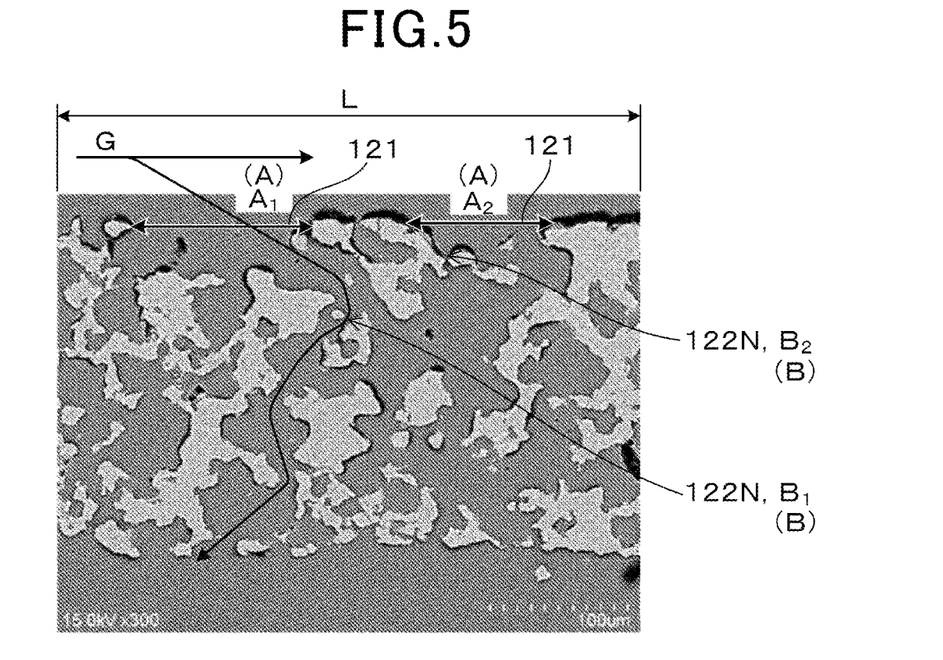
FIG. 5 is a view showing an example of a reflected electron image of a cross section in the thickness direction of the partition wall, acquired by using a scanning electron microscope.
Figure 6:
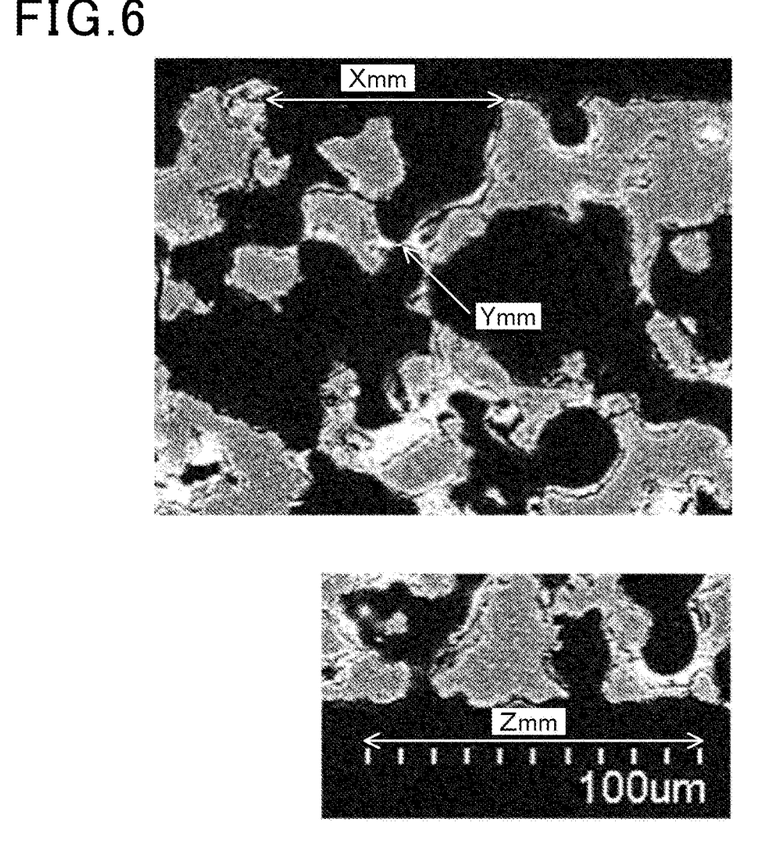
FIG. 6 is a view for explaining a method of measuring a surface opening diameter and an inlet neck diameter from a reflected electron image of a cross section in the thickness direction of the partition wall, acquired by using a scanning electron microscope.

A reflected electron image of a cross section in the thickness direction of the partition wall wall 12 is acquired by using a scanning electron microscope (SEM). However, a portion of the partition wall 12 in which the seal member 13 is present is excluded. At this time, the SEM may be operated at an acceleration voltage of 15 kV and a magnification of 300 times. FIG. 5 shows an example of a reflected electron image of a cross section in the thickness direction of the partition wall 12, acquired by using a scanning electron microscope. In the acquired reflected electron image, the surface opening 121 of the communicating pores 120 to be measured and each portion 122 corresponding to the surface opening 121 are specified. Next, as exemplified in FIG. 6, a scale length Z mm for the reflected electron image is measured. In the example in FIG. 6, the scale length Z mm for the reflected electron image corresponds to 100 µm. Next, in the reflected electron image, an opening length X mm of the surface opening 121 is measured, and the diameter of the surface opening 121 is calculated from a ratio between the opening length X and the scale length (Z mm=100 µm). Thus, the surface opening diameter A can be obtained. In the example in FIG. 6, the surface opening diameter A µm is obtained by the formula 100×X/Z. Similarly, for the communicating pores 120 corresponding to the above surface opening 121, an opening length Y mm of each portion 122 in the reflected electron image is measured, and the diameter of each portion 122 is calculated from a ratio between the opening length Y and the scale length (Z mm=100 µm). In the example in FIG. 6, the diameters of the respective portions 122 are obtained by the formula 100× Y/Z. Then, the smallest diameter out of the diameters of the respective portions 122 can be obtained as the inlet neck diameter B. In this manner, from a single reflected electron image, corresponding to each surface opening diameter A, a single inlet neck diameter B is obtained. That is, from a single reflected electron image, it is possible to obtain the inlet neck diameter B corresponding to the surface opening diameter $A_1$, the inlet neck diameter $B_2$ corresponding to the surface opening diameter $A_2$, . . . the inlet neck diameter $B_n$ corresponding to the surface opening diameter $A_n$. In the partition wall 12, with regard to a magnitude relationship between the surface opening diameter A and the inlet neck diameter B, each surface opening diameter is compared with an inlet neck diameter corresponding to the surface opening diameter. That is, the above example satisfies a magnitude relationship of the inlet neck diameter $B_1$<the surface opening diameter $A_1$, the inlet neck diameter $B_2$<the surface opening diameter $A_2$, . . . the inlet neck diameter $B_n$<the surface opening diameter $A_n$.

In the partition wall 12, as viewed in cross section in the thickness direction of the partition wall 12, the average value of the inlet neck diameters B is 15 μm or less. The average value of the inlet neck diameters B is a value obtained by dividing, by the number of inlet neck diameters B, a total value of the inlet neck diameter B corresponding to each surface opening diameter A obtained from the reflected electron image described above. That is, in the above example, the average value of the inlet neck diameters B can be calculated by the formula (inlet neck diameter $B_1$+inlet neck diameter $B_2$+ . . . +inlet neck diameter $B_n$)/n.

If the average value of the inlet neck diameters B exceeds 15 μm, the probability of collision of PM due to inertial motion in the inlet neck portion 122N is reduced, and a larger amount of PM slips through, leading to a deterioration in PM collection performance in terms of the particulate number of PM. The average value of the inlet neck diameters B may be preferably 14.5 μm or less, more preferably 14 μm or less, and still more preferably 13.5 μm or less.

On the other hand, the average value of the inlet neck diameters B may be preferably 5 μm or more. According to this configuration, an increase in gas permeation resistance due to gas blockage is easily prevented, thus facilitating a reduction in pressure loss. The average value of the inlet neck diameters B may be more preferably 6 μm or more, and still more preferably 7 μm or more.

As exemplified in FIG. 4, as viewed in cross section in the thickness direction of the partition wall 12, the exhaust gas purification filter 1 may have an inner neck portion 126 at a position closer to the inner side than the opening space 121a is. The inner neck portion 126 is a portion in which the pore shape of the communicating pore 120 is narrowed and then widened again. The "position closer to the inner side than the opening space 121a is" refers to a position closer to the gas outflow side than the opening space 121a in the communicating pore 120 is.

In the partition wall 12, in plan view of the surface of the partition wall 12 on the gas inflow side, the surface opening ratio of the communicating pores 120 is 40% or more. The plan view of the surface of the partition wall 12 on the gas inflow side refers to a view of the surface of the partition wall 12 from a direction perpendicular to the surface of the partition wall 12 on the gas inflow side. The surface opening ratio of the communicating pores 120 on the surface of the partition wall 12 on the gas inflow side is measured in the following manner.

Figure 7:
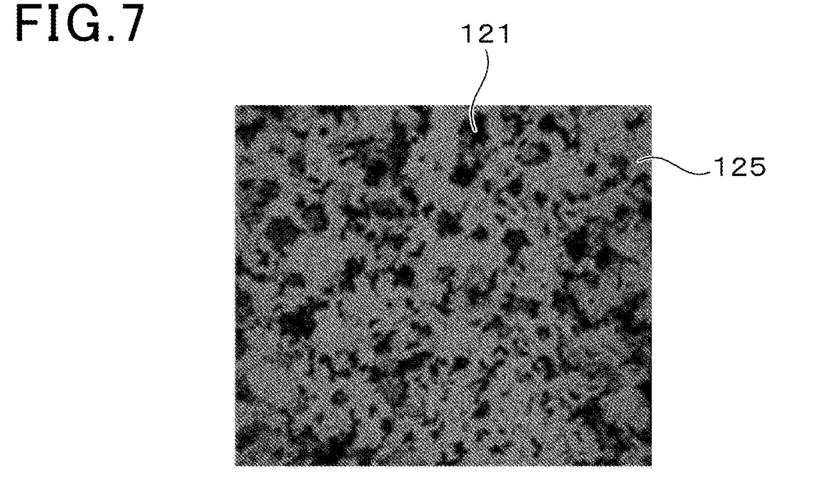
FIG. 7 is a view showing an example of a reflected electron image of a partition wall surface, acquired by using a scanning electron microscope when a surface opening ratio of communicating pores on the partition wall surface is measured.
Figure 8:
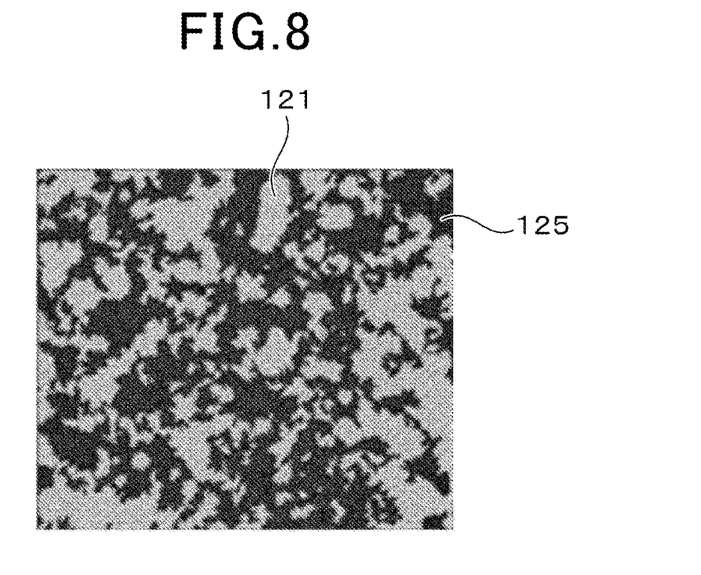
FIG. 8 is a view showing an example of a binarized image obtained by performing binarization processing on the reflected electron image in FIG. 7.

The surface of the partition wall 12 on the gas inflow side and the surface of the partition wall 12 on the gas outflow side each have surface openings 121 of the communicating pores 120. Here, a reflected electron image of the surface of the partition wall 12 on the gas inflow side (i.e., the surface of the partition wall 12 that faces the inflow cells 111 described above) is acquired by using a scanning electron microscope (SEM). However, the surface of the partition wall 12 in the portion in which the seal member 13 is present is excluded. At this time, the SEM may be operated at an acceleration voltage of 10 kV and a magnification of 300 times. FIG. 7 shows an example of a reflected electron image of the surface of the partition wall 11. In the reflected electron image in FIG. 7, black regions indicate surface openings 121 on the surface of the partition wall 12, and light gray regions indicate skeleton portions 125 on the surface of the partition wall 12. Next, binarization processing of the captured image is performed by using image analysis software (WinROOF, manufactured by Mitani Corporation). The binarization processing is performed for the purpose of distinguishing between the surface openings 121 on the surface of the partition wall 12 and the skeleton portions 125 on the surface of the partition wall 12. Since the surface openings 121 and the skeleton portions 125 are different in brightness from each other, the binarization processing is performed after noise that remains in the captured image is removed and an arbitrary threshold is set. The threshold varies among captured images; thus, each captured image is visually checked and a threshold that allows separation between the surface openings 121 and the skeleton portions 125 is set for each captured image. FIG. 8 shows an example of a binarized image. In the binarized image in FIG. 8, the light gray regions indicate the surface openings 121 on the surface of the partition wall 12, and the black regions indicate the skeleton portions 125 on the surface of the partition wall 12. In the obtained binarized image, an area of each surface opening 121 is calculated. From binarized images of five different portions randomly selected on the surface of the partition wall 12, an area of each surface opening 121 obtained as described above is calculated. The surface opening ratio of the communicating pores 120 on the surface of the partition wall 12 on the gas inflow side can be calculated by the formula 100×(total value of the area of the surface openings 121 in all the binarized images described above)/(total value of the area of all the binarized images). All the binarized images refer to the binarized images of the five portions described above.

In plan view of the surface of the partition wall 12 on the gas inflow side, if the surface opening ratio of the communicating pores 120 becomes less than 40%, the surface openings 121 on the surface of the partition wall 12 on the gas inflow side are reduced, and a smaller amount of PM is sucked into the opening space 121a, leading to a deterioration in PM collection performance in terms of the particulate number of PMs. The surface opening ratio of the communicating pores 120 may be 40% or more, preferably 42% or more, more preferably 45% or more, and still more preferably 50% or more. In this manner, PM is easily sucked into the opening spaces 121a that form the surface openings 121, and collision of PM due to inertial motion in the inlet neck portions 122N is more likely to occur; thus, the particulate number of PM collected in the inlet neck portions 122N increases, facilitating an improvement in the PM collection performance On the other hand, the surface opening ratio of the communicating pores 120 may be preferably 80% or less, more preferably 75% or less, and still more preferably 70% or less, from the viewpoint of the strength of the partition wall 12 and the like.

In the exhaust gas purification filter 1, the partition wall 12 may have a porosity of 50% or more and 70% or less. When the porosity of the partition wall 12 is 50% or more, the flow path used by the exhaust gas G to pass through the partition wall 12 is easily secured, thus facilitating a reduction in pressure loss. Furthermore, when the porosity of the partition wall 12 is 70% or less, the strength of the exhaust gas purification filter 1 is easily secured, thus facilitating prevention of cracking due to stress during casing or heat generation during a PM regeneration process. The porosity of the partition wall 12 may be preferably 52% or more, and more preferably 55% or more, from the viewpoint of reducing the pressure loss, and the like. Furthermore, the porosity of the partition wall 12 may be preferably 68% or less, more preferably 67% or less, and still more preferably 66% or less, from the viewpoint of improving the strength of the exhaust gas purification filter 1, and the like.

In pore diameter distribution on the partition wall 12, when D10 represents a pore diameter at which a cumulative pore volume from the smaller pore diameter side is 10%, D10≤10 µm may be preferably satisfied. According to this configuration, it is possible to improve, in addition to the PM collection performance in terms of the particulate number of PM in the inlet neck portions 122N, the PM collection performance in terms of the particulate number of PM in the entire pore structure in the partition wall 12. The pore diameter D10 may more preferably satisfy D10≤9 µm, and still more preferably D10≤8.5 µm.

The porosity and the pore diameter of the partition wall 12 are measured by a mercury porosimeter that uses the principle of a mercury intrusion method. Specifically, a specimen is cut from the exhaust gas purification filter 1. However, a portion of the exhaust gas purification filter 1 in which the seal member 13 is present is excluded. The specimen has a rectangular parallelepiped shape having a size of 15 mm in length×15 mm in width in a direction orthogonal to the filter axial direction X and a length of 20 mm in the filter axial direction X. Next, the specimen is placed in a measurement cell of the mercury porosimeter, and the pressure in the measurement cell is reduced. Then, mercury is introduced into the measurement cell and the measurement cell is pressurized, and from the pressure during the pressurization and the volume of the mercury introduced into the pore of the partition wall 12 of the specimen, the pore diameter and the pore volume are measured. The measurement is performed in a pressure range of 0.5 to 20000 psia. Note that 0.5 psia corresponds to $0.35 \times 10^{-3}$ kg/mm², and 20000 psia corresponds to 14 kg/mm². A range of the pore diameter corresponding to this pressure range is 0.01 to 420 µm. As constants to calculate the pore diameter from the pressure, a contact angle of 140° and a surface tension of 480 dyn/cm are used. In the pore diameter distribution on the partition wall 12, a pore diameter D50 of the partition wall 12 is a pore diameter at which the cumulative pore volume from the smaller pore diameter side is 50% (a pore diameter at 50% of the integrated value of the pore volume). As described above, the pore diameter D10 of the partition wall 12 is a pore diameter at which the cumulative pore volume from the smaller pore diameter side is 10% (a pore diameter at 10% of the integrated value of the pore volume). Furthermore, the porosity of the partition wall 12 can be calculated by the following relational expression.

Porosity (%) of partition wall 12=Total pore volume/(total pore volume+1/true specific gravity of partition wall material)×100

When the partition wall material is cordierite, the true specific gravity of cordierite may be 2.52.

The partition wall 12 may be configured such that, as viewed in cross section in the thickness direction of the partition wall 12, a ratio of a total value of the surface opening diameters A to a length L of the surface of the partition wall 12 on the gas inflow side is 30% or more. According to this configuration, the exhaust gas G is more uniformly introduced into the partition wall 12, leading to higher contribution of the Brownian movement of PM; thus, the probability of collision of PM in the inlet neck portion 122N is increased, facilitating an increase in the PM collection rate.

In calculation of the above ratio, the surface opening diameter A as viewed in cross section in the thickness direction of the partition wall 12 can be measured by the method described above. The total value of the surface opening diameters A refers to a sum total of the surface opening diameter $A_1$, the surface opening diameter $A_2$, ... the surface opening diameter $A_n$ (n is a natural number) observed in the reflected electron image of the cross section in the thickness direction of the partition wall 12. Furthermore, the length of the surface of the partition wall 12 on the gas inflow side as viewed in cross section in the thickness direction of the partition wall 12 can be calculated, in a manner similar to the measurement of the surface opening diameter A described above, by measuring the length L mm (see FIG. 5) of the surface of the partition wall 12 on the gas inflow side in the reflected electron image and obtaining a ratio between the length L and the scale length.

When the exhaust gas purification filter 1 is disposed and used in an exhaust passage of a gasoline engine, that is, used as a GPF, the exhaust gas purification filter 1 can sufficiently exert its effects. However, the exhaust gas purification filter 1 may be disposed and used in an exhaust passage of a diesel engine, that is, used as a DPF.

The exhaust gas purification filter 1 described above can be manufactured, for example, in the following manner.

First, a ceramic raw material powder for forming a partition wall, a binder, a solvent, a pore forming material added as necessary, and an additive added as necessary are mixed, and the mixture is molded into a honeycomb molded body having a large number of through holes.

The ceramic raw material powder for forming a partition wall may be appropriately selected according to the ceramic constituting the partition wall. For example, in the case where the ceramic is aluminum titanate, the ceramic raw material powder may contain a titanium source such as titania, and an aluminum source such as alumina. In the case where the ceramic is cordierite, the ceramic raw material powder may contain a magnesium source such as magnesia, an aluminum source such as alumina, and a silicon source such as silica. In the case where the ceramic is silicon carbide, the ceramic raw material powder may contain a carbon source and a silicon source. The amounts of components to be combined may be appropriately adjusted so that the desired ceramic can be obtained. The ceramic raw material powder for forming a partition wall may have a particle diameter d50 of 5 to 20 µm. The particle diameter d50 can be obtained based on particle diameter distribution on a volume basis using a laser diffraction particle size distribution analyzer (the same applies hereinafter; thus, the description is omitted).

The binder may be an organic binder. Examples of the organic binder include celluloses such as methyl cellulose, carboxymethyl cellulose, hydroxyalkyl methylcellulose, and sodium carboxymethyl cellulose; alcohols such as polyvinyl alcohol; and lignosulfonate.

The pore forming material is a powder, and during firing, the pore forming material is removed from the honeycomb molded body by decomposition, combustion, evaporation, sublimation, or the like, and provides a porous structure in the partition wall. Such a pore forming material is preferably a resin powder. Examples of the resin powder include an acrylic resin powder, a polyethylene powder, a polystyrene powder, and an epoxy resin powder. In the case where the resin powder is used as the pore forming material, when the resin powder is mixed with a ceramic raw material powder having a specific gravity greater than that of the resin powder and the mixture is molded, the resin powder having a smaller specific gravity is easily disposed on a surface side of a partition wall forming portion of the honeycomb molded body, thus facilitating formation of communicating pores that are open at the partition wall surface. The resin powder may have a particle diameter d50 of 5 to 25 μm.

Examples of the additive include a dispersant, a lubricant, and a plasticizer. Here, in order to cause the inlet neck diameter to be small, an anionic dispersant and a cationic dispersant may be used as the additives. Examples of the anionic dispersant include Nopcosperse 44-C (manufactured by Sanyo Chemical Industries, Ltd.) (polycarboxylic acid based), and examples of the cationic dispersant include Nopcosperse 092 (manufactured by Sanyo Chemical Industries, Ltd.). Specifically, in order to impart a positive charge to the ceramic raw material powder, the ceramic raw material powder is pre-kneaded with the cationic dispersant. Furthermore, in order to impart a negative charge to the pore forming material, the pore forming material is pre-kneaded with the anionic dispersant. At this time, the amount of anionic dispersant to be added may be, for example, equal to the amount of cationic dispersant to be added. After the pre-kneading, the ceramic raw material powder to which the cationic dispersant is attached and the pore forming material to which the anionic dispersant is attached may be further kneaded. This promotes contact between the ceramic raw material powder and the pore forming material, thus preventing an increase in the inlet neck diameter after firing. By increasing the ratio of the above additives, it is possible to make an adjustment to increase the surface opening ratio of the communicating pore and the ratio of the total value of the surface opening diameters to the length of the partition wall surface on the gas inflow side. By reducing the ratio of the above additives, it is possible to make an adjustment to reduce the surface opening ratio of the communicating pore and the ratio of the total value of the surface opening diameters to the length of the partition wall surface on the gas inflow side. Specifically, the ratio of the above additives may be determined in the following manner. That is, for example, by adding 4 mass % of additives to a total of 100 mass % of ceramic raw material powder, organic binder, and solvent (water), the surface opening ratio can be adjusted to be close to 50%. If the pre-kneading described above is excessively performed, the pore forming material particles are excessively in contact with each other, leading to an increase in the inlet neck diameter. Thus, it is preferable to appropriately adjust pre-kneading time.

The solvent may be water, alcohol, or the like,

Next, if necessary, an inflow end surface of the honeycomb molded body is masked so that inflow cells are covered. Then, the masked end portion on the inflow end surface side of the honeycomb molded body is immersed in a sealing slurry to fill unmasked openings of outflow cells with the sealing slurry. Next, an outflow end surface of the honeycomb molded body is masked so that the outflow cells are covered. Then, the masked end portion on the outflow end surface side of the honeycomb molded body is immersed in a sealing slurry to fill unmasked openings of the inflow cells with the sealing slurry. Subsequently, the sealing slurry filled in the openings of the outflow cells and the inflow cells is dried to form a sealing forming portion that seals the openings of the cells. At this time, the length of the seal member can be adjusted by changing the time during which the honeycomb molded body is immersed in the sealing slurry and and the depth to which the honeycomb molded body is immersed in the sealing slurry.

Next, the obtained honeycomb molded body is fired to obtain an exhaust gas purification filter. The firing temperature and the firing atmosphere vary depending on the raw materials, and a person skilled in the art can select an optimum firing temperature and firing atmosphere for the selected materials. For example, in the case where the partition wall is made of cordierite, the honeycomb molded body may be fired, for example, in air atmosphere at 1400 to 1450° C.

EXPERIMENTAL EXAMPLES

Preparation of Exhaust Gas Purification Filter

In the present experimental example, test pieces 6 to 17 and 23 to 34 that were composed of exhaust gas purification filters made of cordierite shown in Tables 1 and 2 (described later) were prepared according to the method of manufacturing an exhaust gas purification filter described above.

A ceramic raw material powder for forming a portion including a partition wall and a skin portion (honeycomb substrate portion) and a ceramic raw material powder for forming a seal member both contained kaolin, aluminum hydroxide, alumina, talc, acrylic resin particles (pore forming material), and the like so that cordierite was generated by firing. The combination of the raw materials was adjusted so that the final composition included, as a main component, cordierite made of 45 to 55 wt % of silica, 33 to 42 wt % of alumina, and 12 to 18 wt % of magnesium oxide. Furthermore, the porosity was adjusted by controlling the contents of acrylic resin particles, kaolin, talc, aluminum hydroxide, and the like. In all of the test pieces, the ceramic raw material powder for forming a partition wall and a skin portion had a particle diameter d50 in the range of 5 to 50 μm, and the pore forming material had a particle diameter d50 in the range of 5 to 25 μm. Furthermore, the same amount of additives (anionic dispersant and cationic dispersant) were added to the test pieces 6 to 17, and the same amount of additives (anionic dispersant and cationic dispersant) were added to the test pieces 23 to 34. The amount of additives added to the test pieces 23 to 34 was 80 vol % of the amount of additives added to the test pieces 6 to 17, and the amount of additives added to the test pieces 23 to 34 was 3.2 mass % relative to a total of 100 mass % of ceramic raw material, organic binder, and solvent (water).

During preparation of all the test pieces, the honeycomb molded body was fired in an air atmosphere at a firing temperature of 1440° C. The test pieces had a columnar shape having a filter diameter of 118.4 mm and a filter length of 120 mm. The partition wall had a thickness of 10 mil (254 μm), the number of cells was 300 cpsi, and the cell shape was a quadrilateral shape in cross section. Thus, the exhaust gas purification filters of the test pieces 6 to 17 and 23 to 34 were obtained.

Next, for comparison, test pieces 1 to 5, 18 to 22, and 36 to 46 that were composed of exhaust gas purification filters made of cordierite shown in Tables 1 and 2 (described later) were prepared. Specifically, the exhaust gas purification filters of the test pieces 1 to 5 were obtained in the same manner as that of the test pieces 6 to 17 except that the pore forming material had a particle diameter d50 in the range of more than 25 μm and 45 μm or less. Furthermore, the exhaust gas purification filters of the test pieces 18 to 22 were obtained in the same manner as that of the test pieces 6 to 17 except that the pore forming material had a particle diameter d50 in the range of more than 25 µm and 45 µm or less and that the amount of additives was 80 vol % of the amount of additives of the test piece 6. Furthermore, the exhaust gas purification filters of the test pieces 36 to 46 were obtained in the same manner as that of the test pieces 6 to 17 except that the pore forming material had a particle diameter d50 in the range of 5 µm or more and 45 µm or less and that the amount of additives was 70 vol % of the amount of additives of the test piece 6.

Measurement of Characteristics of Partition Wall

In each of the test pieces, a cross section in the thickness direction of the partition wall was observed by using a scanning electron microscope (SEM). At this time, as the SEM, a Quanta 250 FEG manufactured by FEI was used. The results showed that the partition wall had communicating pores that were open on the partition wall surface on the gas inflow side and on the partition wall surface on the gas outflow side. Furthermore, in each of the test pieces, the porosity and the pore diameter D10 of the partition wall were measured according to the measurement method described above. At this time, as the mercury porosimeter, an AutoPore IV 9500 manufactured by Shimadzu Corporation was used. The results showed that in the test pieces 1 to 17, the porosity of the partition wall was in the range of 58% to 63%, in the test pieces 18 to 34, the porosity of the partition wall was in the range of 52.5% to 57.5%, and in the test pieces 36 to 46, the porosity of the partition wall was in the range of 48% to 55%. Furthermore, in the partition wall of the test pieces 6 to 17 and 23 to 34, the pore diameter D10, which was a pore diameter at which the cumulative pore volume from the smaller pore diameter side was 10%, was 10 µm or less.

In each of the test pieces, the surface opening diameter of the communicating pores on the partition wall surface on the gas inflow side, the average value of the inlet neck diameters, and the ratio of the total value of the surface opening diameters to the length of the partition wall surface on the gas inflow side were measured according to the measurement method described above. At this time, as the SEM, a Quanta 250 FEG manufactured by FEI was used. The results showed that the inlet neck diameter was clearly smaller than the surface opening diameter of the communicating pores. Furthermore, in the test pieces 1 to 17, the average value of the surface opening diameters of the communicating pores was in the range of 80 µm to 170 µm, in the test pieces 18 to 34, the average value of the surface opening diameters of the communicating pores was in the range of 70 µm to 150 µm, and in the test pieces 36 to 46, the average value of the surface opening diameters of the communicating pores was in the range of 60 µm to 120 µm.

In each of the test pieces, the surface opening ratio of the communicating pores was measured according to the measurement method described above. At this time, as the image analysis software, WinROOF Ver.7.4 manufactured by Mitani Corporation was used.

Evaluation

In each of the test pieces, the PM collection rate and the pressure loss were measured.

(PM Collection Rate)

Figure 9:
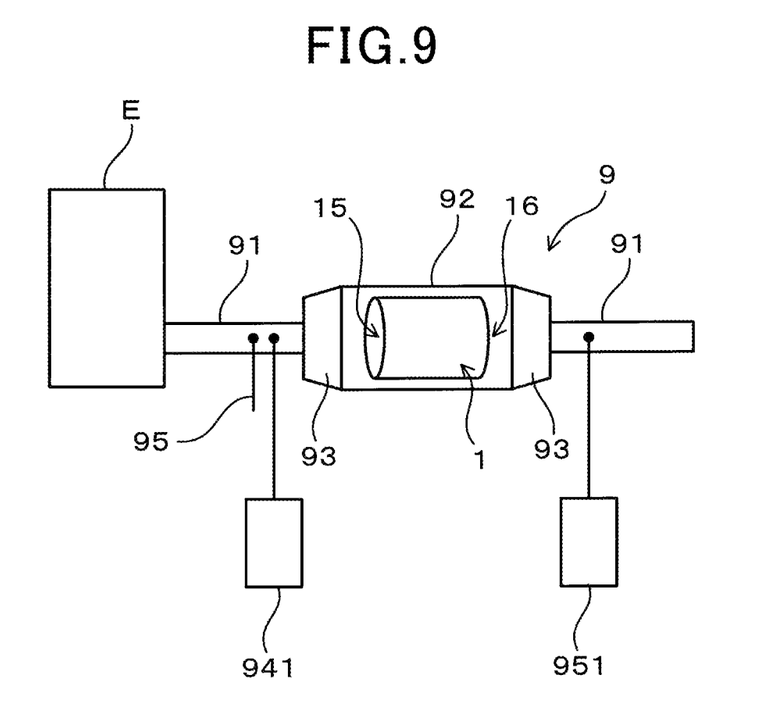
FIG. 9 is a view for explaining a method of measuring a PM collection rate in Experimental Example 1.

The PM collection rate was measured specifically in the following manner. As shown in FIG. 9, a test device 9 was prepared that included pipe portions 91, a case portion 92 in which the exhaust gas purification filter 1 was housed, and cone portions 93 connecting the pipe portions 91 to the case portion 92. The pipe portion 91 on the upstream side from the case portion 92 was connected to an engine E generating exhaust gas. In the present experimental example, as the engine E, a gasoline direct injection engine (turbocharged engine with a displacement of 2.0 L, four-cylinder) was used. In the pipe portion 91 on the upstream side from the case portion 92, an upstream-side PM particle number counter 941 and a temperature sensor 95 were installed. On the other hand, in the pipe portion 91 on the downstream side from the case portion 92, a downstream-side PM particle number counter 951 was installed. As the upstream-side PM particle number counter 941 and the downstream-side PM particle number counter 951, "AVL-489" manufactured by AVL was used. Then, exhaust gas discharged from the gasoline direct injection engine was passed through the exhaust gas purification filter. At this time, $N_{in}$, which represented the number of PM particles in the exhaust gas before the exhaust gas flowed into the exhaust gas purification filter, and $N_{out}$, which represented the number of PM particles in the exhaust gas flowing out of the exhaust gas purification filter, were measured, and the PM collection rate was calculated by the formula $100 \times \{1-(N_{in}-N_{out})/N_{in}\}$. The measurement conditions were a temperature of approximately 500° C. and an intake air amount of 25 g/sec. The above measurement was performed in an initial state in which no PM was deposited in the exhaust gas purification filter.

In the present experimental example, when the PM collection rate was 70% or more, it was determined that the PM collection performance in terms of the particulate number of PM was improved, and the PM collection rate was evaluated as "A". When the PM collection rate was less than 70%, it was determined that the PM collection performance in terms of the particulate number of PM was not improved, and the PM collection rate was evaluated as "C".

(Pressure Loss)

Figure 10:
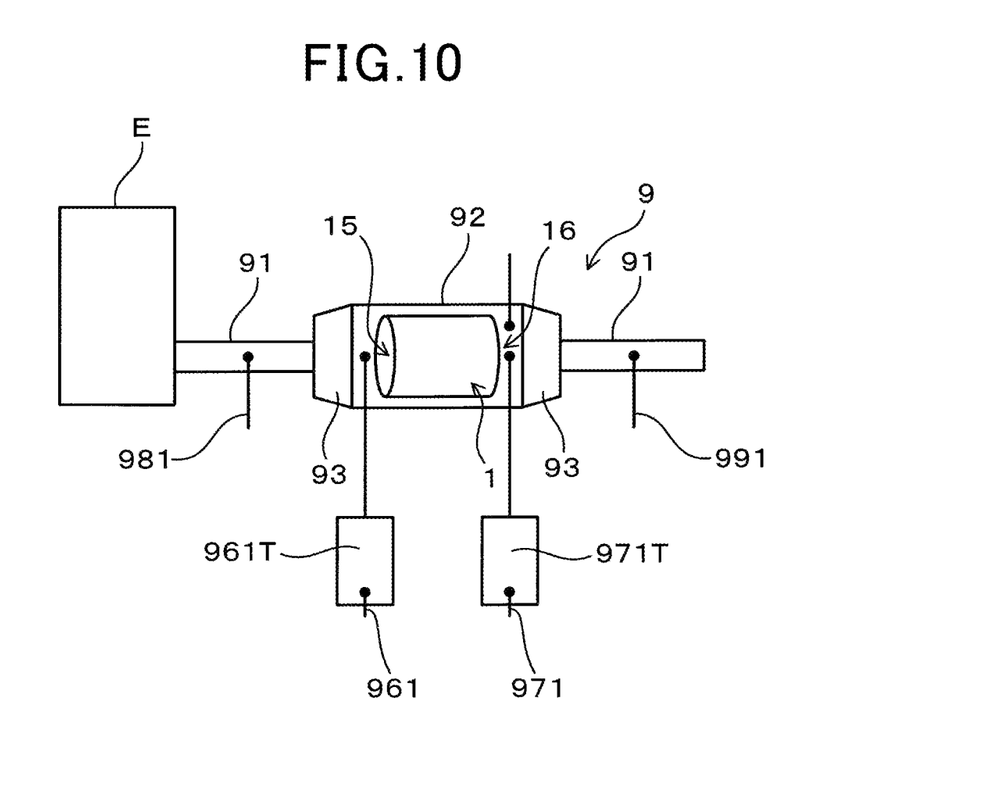
FIG. 10 is a view for explaining a method of measuring pressure loss in Experimental Example 1.

The pressure loss was measured specifically in the following manner. As shown in FIG. 10, a test device 9 was prepared that included pipe portions 91, a case portion 92 in which the exhaust gas purification filter 1 was housed, and cone portions 93 connecting the pipe portions 91 to the case portion 92. The pipe portion 91 on the upstream side from the case portion 92 was connected to an engine E generating exhaust gas. In the present experimental example, as the engine E, a gasoline direct injection engine (turbocharged engine with a displacement of 2.0 L, four-cylinder) was used. In the test device 9, an upstream-side pressure sensor 961 and a downstream-side pressure sensor 971 were installed so that the pressure sensors could measure the pressures before and after the exhaust gas purification filter 1. The reference sign 961T indicates a surge tank for the upstream-side pressure sensor 961, and the reference sign 971T indicates a surge tank for the downstream-side pressure sensor 971. In the pipe portion 91 on the upstream side from the case portion 92, an upstream-side A/F sensor 981 was installed, and in the pipe portion 91 on the downstream side from the case portion 92, a downstream-side A/F sensor 991 was installed. By the upstream-side pressure sensor 961 and the downstream-side pressure sensor 971, the pressure before the exhaust gas purification filter 1 (upstream) and the pressure after the exhaust gas purification filter 1 (downstream) were measured, and a difference between the pressures was determined as the pressure loss. At this time, the measurement conditions were a temperature of 720° C. and an intake air amount of 100 g/sec. The above measurement was performed in an initial state in which no PM was deposited in the exhaust gas purification filter.

In the present experimental example, when the pressure loss was 6 kPa or less, it was determined that the pressure loss was sufficiently reduced, and the pressure loss was evaluated as "A". When the pressure loss exceeded 6 kPa, it was determined that the pressure loss was reduced, and the pressure loss was evaluated as "B".

The results of the experiments are collectively shown in Tables 1 and 2.

As shown in Tables 1 and 2, in the test pieces 6 to 17 and 23 to 34 in which the average value of the inlet neck diameters was 15 μm or less and the surface opening ratio of the communicating pores was 40% or more, the PM collection performance in terms of the particulate number of PM was improved while the pressure loss was reduced.

On the other hand, in the test pieces 1 to 5, 18 to 22, and 36 to 46, the average value of the inlet neck diameters

TABLE 1

| Test piece | Average value of inlet neck diameter (μm) | Surface opening ratio of communicating pores (%) | Ratio of total value of surface opening diameter to length of partition wall surface on gas inflow side (%) | Porosity (%) | PM collection rate (%) | | Pressure loss (kPa) | |
|---|---|---|---|---|---|---|---|---|
| 1 | 25 | 50 | 25 | 58-63 | 32.1 | C | 3.2 | A |
| 2 | 23 | 50 | 25 | | 42.8 | C | 3.33 | A |
| 3 | 21 | 50 | 25 | | 49.2 | C | 3.51 | A |
| 4 | 19 | 50 | 25 | | 57.8 | C | 3.69 | A |
| 5 | 17 | 50 | 25 | | 64.2 | C | 3.96 | A |
| 6 | 15 | 50 | 25 | | 70.6 | A | 4.23 | A |
| 7 | 13 | 50 | 25 | | 76 | A | 4.5 | A |
| 8 | 10 | 50 | 25 | | 80.7 | A | 4.77 | A |
| 9 | 7.5 | 50 | 25 | | 83.9 | A | 5.04 | A |
| 10 | 5 | 50 | 25 | | 86.1 | A | 5.36 | A |
| 11 | 4 | 50 | 25 | | 87.2 | A | 5.76 | A |
| 12 | 13 | 50 | 30 | | 78.2 | A | 4.1 | A |
| 13 | 13 | 50 | 35 | | 80.6 | A | 3.97 | A |
| 14 | 10 | 50 | 30 | | 82.7 | A | 4.4 | A |
| 15 | 10 | 50 | 35 | | 85.2 | A | 4.35 | A |
| 16 | 5 | 50 | 30 | | 87.8 | A | 5.2 | A |
| 17 | 5 | 50 | 35 | | 90.5 | A | 5.09 | A |
| 18 | 25 | 40 | 25 | 52.5-57.5 | 30 | C | 3.55 | A |
| 19 | 23 | 40 | 25 | | 40 | C | 3.7 | A |
| 20 | 21 | 40 | 25 | | 46 | C | 3.9 | A |
| 21 | 19 | 40 | 25 | | 54 | C | 4.1 | A |
| 22 | 17 | 40 | 25 | | 60 | C | 4.4 | A |

TABLE 2

| Test piece | Average value of inlet neck diameter (μm) | Surface opening ratio of communicating pores (%) | Ratio of total value of surface opening diameter to length of partition wall surface on gas inflow side (%) | Porosity (%) | PM collection rate (%) | | Pressure loss (kPa) | |
|---|---|---|---|---|---|---|---|---|
| 23 | 15 | 40 | 25 | 52.5-57.5 | 66 | A | 4.7 | A |
| 24 | 13 | 40 | 25 | | 71 | A | 5 | A |
| 25 | 10 | 40 | 25 | | 74 | A | 5.3 | A |
| 26 | 7.5 | 40 | 25 | | 77 | A | 5.6 | A |
| 27 | 5 | 40 | 25 | | 79 | A | 5.95 | A |
| 28 | 4 | 40 | 25 | | 80 | A | 6.4 | B |
| 29 | 13 | 40 | 30 | | 73.1 | A | 4.5 | A |
| 30 | 13 | 40 | 35 | | 75.3 | A | 4.41 | A |
| 31 | 10 | 40 | 30 | | 75.9 | A | 4.9 | A |
| 32 | 10 | 40 | 35 | | 78.1 | A | 4.83 | A |
| 33 | 5 | 40 | 30 | | 80.6 | A | 5.8 | A |
| 34 | 5 | 40 | 35 | | 83 | A | 5.66 | A |
| 36 | 25 | 35 | 25 | 48-55 | 27 | C | 3.91 | A |
| 37 | 23 | 35 | 25 | | 36 | C | 4.07 | A |
| 38 | 21 | 35 | 25 | | 41.4 | C | 4.29 | A |
| 39 | 19 | 35 | 25 | | 48.6 | C | 4.51 | A |
| 40 | 17 | 35 | 25 | | 54 | C | 4.84 | A |
| 41 | 15 | 35 | 25 | | 59.4 | C | 5.17 | A |
| 42 | 13 | 35 | 25 | | 61.8 | C | 5.5 | A |
| 43 | 10 | 35 | 25 | | 64.4 | C | 6.1 | B |
| 44 | 7.5 | 35 | 25 | | 65.8 | C | 6.44 | B |
| 45 | 5 | 35 | 25 | | 67.2 | C | 6.84 | B |
| 46 | 4 | 35 | 25 | | 68 | C | 7.36 | B | exceeded 15 μm, or the average value of the inlet neck diameters exceeded 15 μm and the surface opening ratio of the communicating pore was less than 40%, and thus, the PM collection performance in terms of the particulate number of PM was not improved.

In comparison of the test pieces 6 to 17 and 23 to 34, it was confirmed that when the ratio of the total value of the surface opening diameters to the length of the partition wall surface on the gas inflow side was 30% or more, the PM collection performance was easily improved.

The present disclosure is not limited to the embodiments or the experimental examples, and can be variously modified without departing from the gist of the present disclosure. That is, the present disclosure has been described in accordance with the embodiments; however, it is understood that the present disclosure is not limited to the embodiments or the structures. The present disclosure includes various modifications and modifications within the equivalent range. In addition, various combinations and forms, as well as other combinations and forms including only one element, more or less, are within the scope and spirit of the present disclosure.

What is claimed is:

1. An exhaust gas purification filter comprising:
a plurality of cells each disposed to extend in an axial direction (X) of the filter, each of the cells having opposing first and second ends in the axial direction;
a partition wall configured to have a porous structure and define the plurality of cells partitioned from each other; and
a plurality of seal members disposed alternately in the first and second ends of the respective cells, each of the seal members being configured to seal a corresponding one of the first end and the second end of a corresponding one of the cells, wherein:
the partition wall has a gas-inflow-side surface, a gas-outflow-side surface, and communicating pores, each of the communicating pores being formed through the partitioning wall to open on each of the gas-inflow-side surface and gas-outflow-side surface,
each of the communicating pores has, as viewed in cross section in a thickness direction of the partition wall, a surface opening on the gas-inflow-side surface and a plurality of portions,
each of the portions of each of the communicating pores having a diameter, the diameter of each of the portions of each of the communicating pores being reduced and then increased again from the surface opening of the corresponding one of the communicating pores, one of the portions of each of the communication pores, whose diameter is the smallest, being defined as an inlet neck portion of the corresponding one of the communication pores,
the surface opening of each of the communication pores has a diameter defined as a surface opening diameter,
the inlet neck portion of each of the communication pores has a diameter defined as an inlet neck diameter,
the inlet neck diameter of each of the communication pores is smaller than the surface opening diameter thereof, and
an average value of the inlet neck diameters of the communication pores is 15 μm or less; and
a surface opening ratio of the communicating pores in plan view of the gas-inflow-side partition wall surface is 40% or more.

2. The exhaust gas purification filter according to claim 1, wherein in pore diameter distribution on the partition wall, in response to D10 representing a pore diameter at which a cumulative pore volume from a smaller pore diameter side is 10%, D10≤10 μm is satisfied.

3. The exhaust gas purification filter according to claim 1, wherein the average value of the inlet neck diameters of the communication pores is 5 μm or more.

4. The exhaust gas purification filter according to claim 2, wherein the average value of the inlet neck diameters of the communication pores is 5 μm or more.

5. The exhaust gas purification filter according to claim 1, wherein as viewed in cross section in the thickness direction of the partition wall, a ratio of a total value of the surface opening diameters of the communication pores to a length of the gas-inflow-side surface of the partition wall is 30% or more.

6. The exhaust gas purification filter according to claim 2, wherein as viewed in cross section in the thickness direction of the partition wall, a ratio of a total value of the surface opening diameters of the communication pores to a length of the gas-inflow-side surface of the partition wall is 30% or more.

7. The exhaust gas purification filter according to claim 3, wherein as viewed in cross section in the thickness direction of the partition wall, a ratio of a total value of the surface opening diameters of the communication pores to a length of the gas-inflow-side surface of the partition wall is 30% or more.

8. The exhaust gas purification filter according to claim 4, wherein as viewed in cross section in the thickness direction of the partition wall, a ratio of a total value of the surface opening diameters of the communication pores to a length of the gas-inflow-side surface of the partition wall is 30% or more.

* * * * *